(12) United States Patent
Zhao et al.

(10) Patent No.: US 6,644,917 B2
(45) Date of Patent: Nov. 11, 2003

(54) SMART COATING SYSTEM WITH CHEMICAL TAGGANTS FOR COATING CONDITION ASSESSMENT

(75) Inventors: Ji-Cheng Zhao, Niskayuna, NY (US); James Anthony Ruud, Delmar, NY (US); John Eric Tkaczyk, Delanson, NY (US); Ann Melinda Ritter, Niskayuna, NY (US); Melvin Robert Jackson, Niskayuna, NY (US); Jerome Johnson Tiemann, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/682,282

(22) Filed: Aug. 14, 2001

(65) Prior Publication Data

US 2003/0118440 A1 Jun. 26, 2003

(51) Int. Cl.[7] .............................................. F01D 21/00
(52) U.S. Cl. ....................... 415/200; 416/61; 416/241 R
(58) Field of Search ................................. 415/118, 200, 415/169.1; 416/61, 241 R, 241 B (56) References Cited

U.S. PATENT DOCUMENTS

| | | | | |
|---|---|---|---|---|
| 4,476,674 A | * | 10/1984 | Berman .................... | 60/39.182 |
| 4,836,039 A | * | 6/1989 | de Silva et al. ......... | 73/864.81 |
| 4,933,556 A | * | 6/1990 | Stewart et al. ......... | 250/390.01 |
| 5,261,931 A | * | 11/1993 | Wright ............................ | 95/3 |
| 5,865,598 A | * | 2/1999 | Twerdochlib ............... | 415/118 |
| 6,062,811 A | * | 5/2000 | Zombo et al. .............. | 415/118 |
| 6,200,088 B1 | * | 3/2001 | Zombo et al. .............. | 415/118 |
| 2002/0033098 A1 | * | 3/2002 | Hiltunen ...................... | 95/269 |
| 2002/0144931 A1 | * | 10/2002 | Sechrist et al. ............. | 208/113 |

OTHER PUBLICATIONS

"Monitoring Solid Particle Erosion in Turbines by Debris Analysis", by Charles Blatchley et al., Advances in STeam Turbine Technology for Power Generaton, The American Society of Mechanical Engineers, New York, NY (1990).
"Measuring Wear in Turbine and Internal Combustion Comonents by Surface Layer Activaton", by Charles C. Blatchley et al., Tribological Mechanisms and Wear Problems in Materials, ASM International (1987).

* cited by examiner

*Primary Examiner*—Edward K. Look
*Assistant Examiner*—James M McAleenan
(74) *Attorney, Agent, or Firm*—Paul J. DiConza; Patrick K. Patnode (57) ABSTRACT

A on-line method is provided for detecting wear and/or damage to gas turbine parts. Preferred embodiments of the invention provide a gas turbine comprising parts with smart coatings and collection and detection means to measure wear and erosion of gas turbine parts. In other preferred embodiments, smart coatings are provided comprising chemical taggants that can be collected and detected downstream, thus providing an on-line or in situ evaluation technology for wear and damage to gas turbine parts.

33 Claims, 8 Drawing Sheets

SMART COATING SYSTEM WITH CHEMICAL TAGGANTS FOR COATING CONDITION ASSESSMENT

BACKGROUND OF INVENTION

The invention relates to an on-line or in-situ method of assessing wear and/or damage that has occurred to turbine parts. The invention also relates to a gas turbine comprising parts with smart coatings and collection and detection means to measure wear and erosion of gas turbine parts.

The current industry practice for determining wear and damage of gas turbine parts is schedule-based shutting down of a turbine and physically examining parts at predetermined intervals. However, this process is highly inefficient, time consuming, and costly due to turbine shut-down and maintenance. In response, general on-line or in-situ methods have been developed for detecting wear-out of outer surfaces of wear-susceptible parts.

For example, Blatchley and coworkers (C. C. Blatchley and R. J. Bricault Jr., in *Tribological Mechanisms & Wear Problems in Materials*, ASM International, Metals Park, Ohio, 1987, pp. 95–100 and C. C. Blatchley and P. G. Loges, in *Advances in Steam Turbine Technology for Power Generation*, ASME, New York, N.Y., 1990, Vol. 10, pp. 9–13) developed a "surface layer activation" technique to monitor wear and corrosion in steam turbines by detecting gamma-ray signals from radionuclides imbedded in trace amounts in surfaces of wearing parts. The nuclides served as surface markers, and were produced by controlled exposure to particles from Van de Graaff or cyclotron accelerators.

However, the above techniques can only be applied to steam turbines, which are closed systems, so that radioactive materials in the water stream will not be released to the environment. The technique cannot be applied to gas turbines because the exhaust is released into the air, and radioactive elements will be detrimental to the environment.

Other existing coating life estimation methods are typically based on average effects of stress and temperature profiles of all the parts. These methods are unable to focus on individual parts because they do not take into account the circumstances that the parts installed in a particular turbine actually encounter, such as foreign object damage, variation of operating conditions from site to site, and occasional overfiring of the turbine. All of these circumstances can drastically influence the true remaining life of the individual parts.

Thus, there exists a need for an on-line or in-situ assessment of coatings and wear of gas turbine parts, without turbine shut-down or disassembly. Accordingly, an online or in situ method for detecting wear and/or damage of gas turbine parts is desirable. Also, a gas turbine which can be efficiently, and reliably measured online or in situ for wear, is also particularly desirable.

SUMMARY OF INVENTION

There is provided, in accordance with one preferred embodiment of the invention, an on-line method of assessing wear and/or damage to gas turbine parts, comprising the steps of: (a) coating one or more gas turbine parts with a coating comprising a taggant; (b) collecting and concentrating particles of an exhaust stream which passed over a part coated in step (a) to provide a particulate containing fraction; and (c) analyzing the particulate containing fraction for the taggant, whereby the presence of a taggant indicates wear and/or damage to the gas turbine part.

There is also provided, in accordance with another preferred embodiment of the invention, a gas turbine, comprising: (a) one or more gas turbine parts coated with a coating comprising a taggant; (b) an exhaust collector in fluid communication with the gas turbine parts, whereby the collector samples a portion of an exhaust gas which passed over the coated gas turbine parts; (c) an exhaust particle separator connected to said particle collector, whereby the separator separates and concentrates particulate matter in the exhaust gas; and (d) an optional analyzer connected to the separator, wherein the elemental analyzer is capable of detecting the taggant.

There is also provided, in accordance with another preferred embodiment of the invention, a part for a gas turbine comprising: a) a turbine component substrate; and b) an environmentally resistant coating applied on the turbine component substrate. Preferably, the environmental coating or the coating/substrate interface comprises a taggant selected from the group consisting of Sr, La, Ce, Pr, Nd, Sm, Eu, Gd, Tb, Dy, Ho, Er, Tm, Yb, Lu, Re, Ru, Pd, Pt and Au. Preferably, these elements are present exclusively as taggants so that their collection pinpoints where damage has occurred.

There is also provided, in accordance with another preferred embodiment of the invention, a part for a gas turbine comprising: a) a turbine component substrate; b) a bond coat applied on the turbine component substrate; and c) a thermal barrier coat (TBC) applied on the bond coat, wherein the TBC or a TBC interface comprises a taggant selected from the group consisting of Sr, La, Ce, Pr, Nd, Sm, Eu, Gd, Tb, Dy, Ho, Er, Tm, Yb, and Lu, and the bond coat or a bond coat interface comprises a taggant selected from the group consisting of La, Ce, Pr, Nd, Sm, Eu, Gd, Tb, Dy, Ho, Er, Tm, Yb, Lu, Re, Ru, Pd, Pt, and Au, and wherein the TBC or TBC interface taggant is different from the bond coat or bond coat interface taggant. There is also provided, in accordance with another preferred embodiment of the invention, a gas turbine, comprising: (a) one or more gas turbine parts provided with a coating comprising a taggant; (b) a collector means for sampling a portion of an exhaust gas which passed over the coated gas turbine parts; and (c) a separator means for separating particles from the exhaust gas.

DETAILED DESCRIPTION

The present inventors discovered an in situ assessment method in which coatings on gas turbine parts are doped with unique taggants which, when detected in downstream exhaust gases, will indicate precisely which set of parts are deteriorating, and to what level. This provides improved knowledge of the coated part's condition and alters the replacement and repair strategy, thereby improving subsequent up-time of the machine. Moreover, these smart coatings can indicate their state of wear and/or damage while the machine that contains them is in full operation.

Thus, a preferred embodiment is a gas turbine comprising parts whose coatings are comprised of a sequence of layers, each of which contains a specific taggant atom or compound, and exhaust particulate collection elements and detection elements for collecting and detecting taggants in gas exhaust streams originating from or passing over those coated parts comprising taggants. However, the invention is not limited to a gas turbine.

The preferred embodiments of the invention also provide an online method of assessing wear and damage that has occurred to gas turbine parts. "Online" means that the assessment can be determined without interrupting the operation of the turbine. The preferred embodiments of invention include smart coatings containing chemical taggants which serve as online indicators of the degree of wear and damage of gas turbine section parts.

The taggants are either chemical compounds or elements doped into gas turbine part coatings. The taggants are identified in an exhaust stream, indicating wear or damage to the particular gas turbine parts. The preferred embodiments of the invention include incorporation of different chemical taggants into different sets of parts of gas turbines. Since the taggants could originate from any part, different taggants may be used to detect wear from particular parts, for example, for airfoils in different turbine stages or rows.

These taggants are preferably stable and relatively inactive with respect to diffusion at the high turbine operating temperatures involved, and do not have a deleterious effect on coating and turbine performance. Preferably, the instant taggants are sufficiently unique to the turbine environment and reliably detectable in small concentrations.

The parts containing the taggants preferably are those parts of a gas turbine that are typically prone to wear or damage, and include, but are not limited to combustors, transition pieces, and high pressure turbine airfoils. Generally, one of ordinary skill can easily determine other candidate parts such as first stage high pressure turbine blades, through normal operation and maintenance of gas turbines, and therefore, these parts are also well within the scope of the instant invention. Coatings of the preferred embodiments of the invention may be applied to the entire surface of these parts, or alternatively, to a portion of these parts. Preferably, the taggants are doped into layers or interfaces of coatings that are present in turbine parts that are subject to wear and damage, erosion, oxidation, and corrosion.

Figure 1:
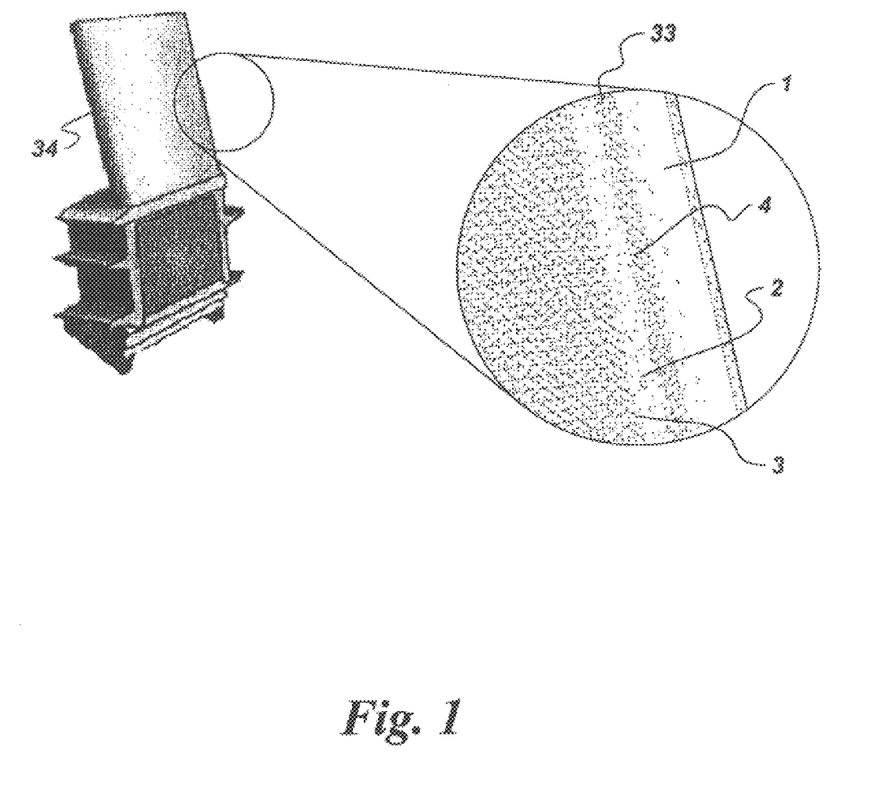
FIG. 1 Depicts the outer region of a typical turbine part according to a preferred embodiment of the instant invention.

Coatings for insulating gas turbine parts are known to the skilled artisan and include, for example, several layers of differing compositions and properties, in order to provide an optimal combination of benefits. For example, FIG. 1 depicts the outer region of a typical turbine part. One coating is a ceramic insulating layer, referred to as a thermal barrier coating (TBC) 1. Another coating is a thin metallic layer, termed a bond coat 2, which is applied on the turbine component substrate 34 to adhere the TBC. The bond coat contributes to the ability of the protective ceramic coating to adhere to the turbine component substrate 34 through many cycles of gas turbine startup and shut down. A protective thermally grown oxide (TGO) 33, typically a layer of aluminum oxide (alumina), which resists the oxidizing effects of the hot gas stream, is formed between the bond coat and the TBC.

In another preferred embodiment of the instant invention, a turbine component substrate may be directly coated with a surface layer known as an environmental coating without a TBC layer. Typical environmental coatings are known to those of ordinary skill and may comprise taggants wherein oxidation and wear of the environmental coating can be assessed by collecting exhaust gases which passed over the coatings.

According to another preferred embodiment of the instant invention, any or all of the above, or any other coatings may be doped with specific taggant elements. Preferably the taggants are doped in a plurality of layers, and/or layer interfaces, such as the TBC, TBC/bond coat interface, bond coat, bond coat/TGO interface, bond coat/turbine shell interface, and environmental coating/substrate interface.

With reference again to FIG. 1, first taggant atoms 3 are located at the bond coat/turbine component substrate interface, while a second type of taggant atoms 4 are located at the TBC/TGO interface. Alternatively, specific atoms or compounds which serve as taggants may be doped into the layers of the turbine parts. One will readily appreciate that observation of a taggant atom 3 from the inner layer 2 is indicative of approach of an "end of life" condition of the coating on the turbine part. During the early operation of this part, the outer TBC layer 1 may be eroding. When most of the outer TBC layer 1 has been eroded away, the taggant atoms 4 will be present in the exhaust. When erosion has progressed to the point that the inner layer 2 is exposed, the uniquely different taggant atoms in this layer 3 will start to appear in the particulate matter collected from the exhaust. In this way, the preferred embodiment of the invention provides a method to evaluate degree or level of wear of particular turbine parts.

With regard to specific taggant selection, individual compounds or constituent layers may suffice. For example, there is very little zirconium or yttrium in a turbine that does not originate from the TBC. Thus, to a great extent, the TBC layer may serve as its own taggant. One potential inherent taggant for fingerprinting the exposure of TBC/bond coat interface is the thermally grown oxide (TGO). Thus, if the alumina content in the exhaust shows appreciable deviation from usual level, it may be a good indication of TGO spallation.

In selecting potential taggant elements for turbine analysis, those elements commonly found in Ni-base superalloys and steels may be avoided, such as Ni, Co, Cr, Fe, Al, Ti, Nb, Ta, C, B, Si, W, Mn, and V because the turbine component substrate is often made of Ni-based superalloys and steels. However, these elements may serve as taggants if the amount of the taggant is detected rather than their presence. Zr and Y are major elements for TBC. Although the TBC itself may serve as a taggant, these two elements may not serve as taggants for bond coats or environmental coatings. Group IA elements (H, Li, Na, K, Rb, Cs, Fr) may be too active and unstable at high temperatures to be served as taggants.

Group IIA elements (Be, Mg Ca, Sr, Ba, and Ra) may serve as taggants. Sr is most preferred. Be is less preferred because BeO is environmentally unfavorable. Mg and Ca are less preferred because they already appear in turbines from ingested materials. Ba and Ra are less preferred because Ba may be too reactive and unstable and Ra is very expensive.

In group IIIB elements (Sc, Y, Lanthanide series, Actinide series), Lanthanide elements are preferred taggant elements. Y is usually present in turbine systems and is less preferred. Sc is extremely expensive and the Actinides are either radioactive and/or extremely expensive, and are thus less preferred.

All group IVB elements (Ti, Zr, Hf) are already typically present in turbine systems, and thus these elements are not preferred as taggants for gas turbine applications. However, these elements may serve as taggants if the amount of the taggant is detected rather than their presence.

Groups VB and VIB elements (V, Nb, Ta, Cr, Mo, W) are all present in Ni-based superalloys, and are not preferred taggants. However, these elements may serve as taggants if the amount of the taggant is detected rather than their presence, as well as being used as taggants in certain circumstances.

In Group VIIB elements (Mn, Tc and Re), Mn exists in steels, Tc is radioactive and expensive, and are thus not preferred. However Re is preferred since many turbines do not comprise Re-containing superalloys.

Several group VIIIB elements, such as Ru, Pd, and Pt are preferred candidates as taggants. Os, Ir and Rh are extremely expensive and the rest of the elements in the group (Fe, Co, Ni) already exist in Ni-based superalloys and steels, and are thus less preferred.

With regard to IB elements, Cu and Ag are detrimental to superalloy properties, and thus only Au in the group is a preferred taggant.

All group IIB elements (Zn, Cd, and Hg) are not preferred because they have a low melting temperature and they can be detrimental to superalloy and coating properties.

All group IIIA and IVA elements (B, Al, Ga, In, and Tl, C, Si, Ge, Sn, Pb) are either already in the system (B, Al, C, and Si) or low-melting, and are thus not preferred taggants.

All elements in groups VA, VIA, VIIA are not preferred as taggants because either they are already in the turbines (N, O, F, P, S, etc.) or they demonstrate a low melting point and/or detrimental to the superalloy performance.

Inert gases cannot be kept in coatings for extended periods of time, and are thus not preferred.

In summary, those particular elements that are preferred as taggants, are listed in Table 1. It can be seen from Table 1 that some elements may serve as taggants for both the bond coat and TBC, others can preferably serve as taggants for either the bond coat or TBC. Preferably, the taggants for the bond coat and the TBC are different.

TABLE 1

Chemical Taggants for Turbine Analysis

| Taggant | Melting Point ° C. | Interaction with Ni | Oxide Properties | Taggant for bond coat | Taggant for TBC |
|---|---|---|---|---|---|
| Sr | 768 | Low solubility in Ni Eutectic = 660° C. | SrO m.p.* = 2420° C. SrO$_2$ d.c.** = 215° C. | No | SrO |
| La | 920 | No solubility in Ni Eutectic = 1270° C. | La$_2$O$_3$ m.p. = 2210° C. | La | La$_2$O$_3$ |
| Ce | 795 | Low solubility in Ni Eutectic = 1210° C. | Ce$_2$O$_3$ m.p. = 1629° C. CeO$_2$ m.p. = 2600° C. | Ce | CeO$_2$ |
| Pr | 935 | No solubility in Ni Eutectic = 1280° C. | PrO$_2$ m.p. >>1200° C. | Pr | PrO$_2$ |
| Nd | 1024 | No solubility in Ni Eutectic = 1290° C. | Nd$_2$O$_3$ m.p. = 1900° C. | Nd | Nd$_2$O$_3$ |
| Sm | 1072 | No solubility in Ni Eutectic = 1280° C. | Sm$_2$O$_3$ m.p. = 2350° C. SmO m.p. = 1175° C. | Sm | Sm$_2$O$_3$ |
| Eu | 826 | Solubility <0.3 at % Eutectic = 1200° C. | Eu$_2$O$_3$ m.p. = 2300° C. Eu$_3$O$_4$ m.p. = 2000° C. | Eu | Eu$_2$O$_3$ |
| Gd | 1312 | Low solubility in Ni Eutectic = 1290° C. | Gd$_2$O$_3$ m.p. = 2330° C. | Gd | Gd$_2$O$_3$ |
| Tb | 1356 | Low solubility in Ni Eutectic > 1200°C. | Tb$_2$O$_3$ m.p. > 1200° C. | Tb | Tb$_2$O$_3$ |
| Dy | 1407 | No solubility in Ni Eutectic = 1279° C. | Dy$_2$O$_3$ m.p. = 2430° C. | Dy | Dy$_2$O$_3$ |

TABLE 1-continued

Chemical Taggants for Turbine Analysis

| Taggant | Melting Point ° C. | Interaction with Ni | Oxide Properties | Taggant for bond coat | Taggant for TBC |
|---|---|---|---|---|---|
| Ho | 1461 | — | $Ho_2O_3$ m.p. = 2350° C. | Ho | $Ho_2O_3$ |
| Er | 1497 | No solubility in Ni Eutectic = 1280° C. | $Er_2O_3$ m.p. > 2200° C. | Er | $Er_2O_3$ |
| Tm | 1545 | — | $Tm_2O_3$ m.p. = 2400° C. | Tm | $Tm_2O_3$ |
| Yb | 824 | No solubility in Ni Eutectic = 1230° C. | $Yb_2O_3$ m.p. = 2346° C. | Yb | $Yb_2O_3$ |
| Lu | 1652 | — | $Lu_2O_3$ m.p. = 2410° C. | Lu | $Lu_2O_3$ |
| Re | 3180 | High solubility in Ni | $Re_2O_3$ m.p. = 1450° C. | Re | No |
| Ru | 2500 | High solubility in Ni | $RuO_4$ m.p. = 25° C. | Ru | No |
| Pd | 1552 | Completely soluble | PdO m.p. + 870° C. | Pd | No |
| Pt | 1789 | Completely soluble | PtO | Pt | No |
| Au | 1063 | Completely soluble | $Au_2O_3$ | Au | No |

*m.p. = melting point
**d.c. = decomposition temperature

For example, Ce, Sc and Lanthanide taggants can be incorporated into the TBC coating without compromising the commonly used yttria-stabilized zirconia (YSZ) TBC coating, because ceria, scandia, and some lanthanide oxides are known to be stabilizers for zirconia, but are not commonly used in TBCs on turbine hardware. Virtually all of the rare earth elements form solid solutions with zirconia. Eu-doped yttria could be used as both a chemical and a fluorescent taggant. For bond coats and environmental coatings, precious metals, such as Pt, are known to be beneficial to oxidation and hot corrosion resistance, but are not commonly used in coatings for industrial gas turbines, thus they are preferred as taggants. Most lanthanide elements may also serve as taggants for bond coats, as shown in Table 1.

The taggant is preferably applied in an analytically detectable amount so that the taggant may be identified in a sample of the exhaust stream, thus indicating wear or damage of a gas turbine part, or wear of a coating layer comprising the taggant. Generally, the taggant may be applied in amounts from 0.01 to 2 atomic percent except for Ru which can be added up to 25 atomic percent.

On the taggant processing side, commonly used methods can be utilized to apply the instant smart coatings to gas turbine parts. For example, physical vapor deposition (PVD) such as sputtering, chemical vapor deposition (CVD), plasma-spray or plasma-arc may be used in application of the instant coatings. These techniques are commonly used in the art, and are described for example, in U.S. Pat. No. 4,948,484, which is incorporated herein by reference in its entirety. In particular, plasma-spray may be used to make graded metal/ceramic and ceramic/ceramic coatings, such as TBC, using co-deposition methods. Coatings and taggants can also be applied by ion plasma deposition, ion implantation, and high velocity oxy-fuel (HVOF).

Figure 2:
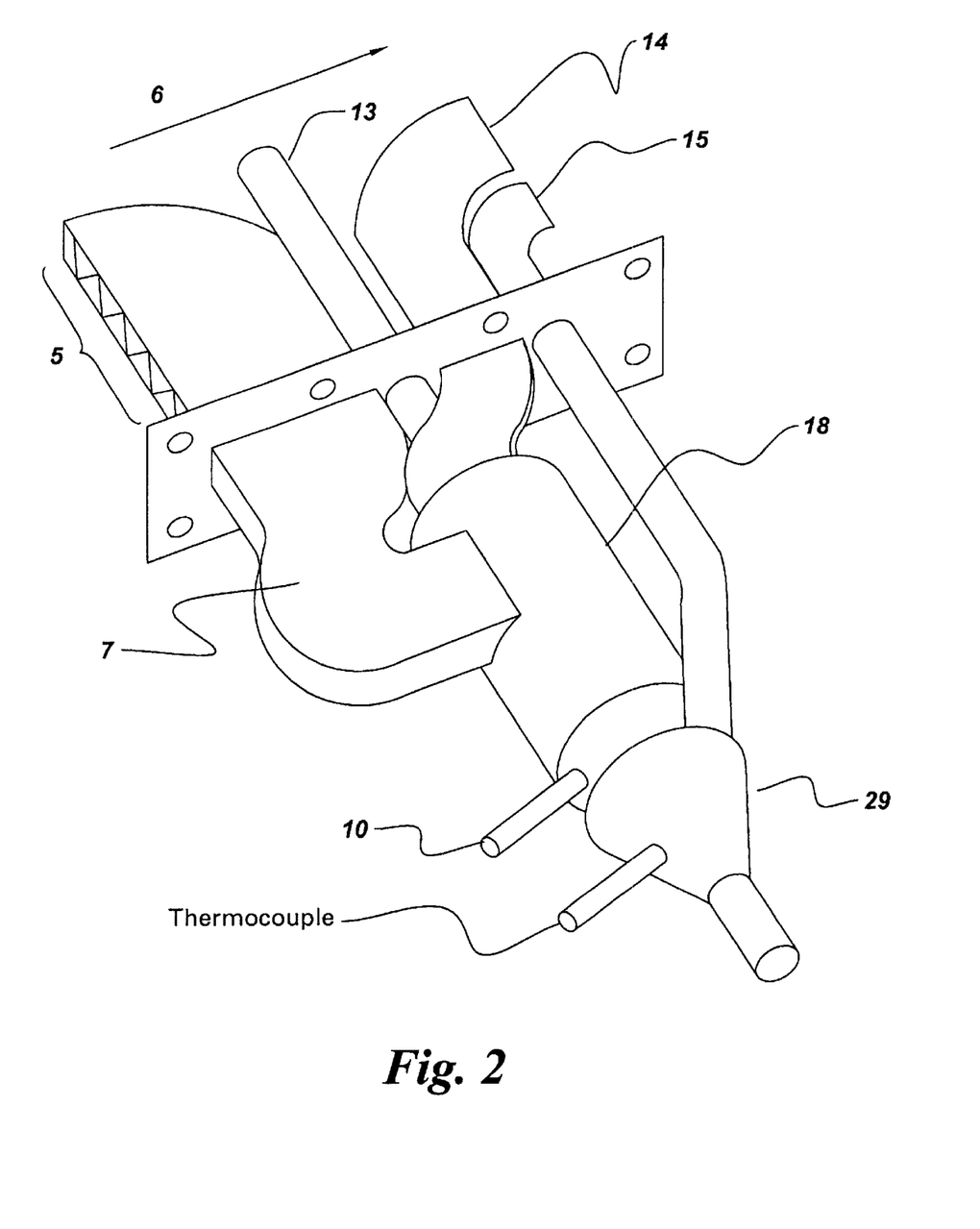
FIG. 2 Depicts a perspective view of an embodiment of the invention for collecting particles from an exhaust stream.

Alternatively, the smart coatings containing taggants may be applied by powder coating methods. Many methods are known to those of ordinary skill for doping powders with taggants and include, for example, co-deposition, surface coating of powder particles, and doping of original powders, to name a few. For bond coats and environmental coatings, the taggants can be added into the starting powders by alloying, for example, when the bond coat is applied by plasma-spray or HVOF. It is advantageous to assess the conditions of the coatings on the parts of gas turbines in situ since repair will be much more expensive and less feasible when damage to the parts has reached a superalloy substrate (base metal). Therefore, the invention also provides an in situ means for inspection or sampling of part surfaces. FIG. 2 (perspective view) and FIG. 3 (cross-section view) depict one embodiment of the invention for collecting particles from the exhaust stream. These Figures depict a single one of a plurality of tubes 5, such as Pitot tubes, having open ends that face directly into the exhaust gas stream 6 and collect a small percentage of the exhaust stream. Each of the tubes 5 delivers its exhaust sample via duct 7 to a separator 8 such as a cyclone separator, which concentrates the particulate matter while cooling the gas which contains these particles. The output of the separator is directed to a water-gas separator 29 which comprises a cone-shaped surface 11 (FIG. 3) over which a flowing stream of water 9 passes from a rinse water inlet 10, so that the particles are captured by the water stream 9, which flows down water outlet 30 shown at the bottom of FIG. 3. Thermocouple 13 measures the temperature of the exhaust gas. A manifold 36 may be provided to distribute water stream 9 completely around a circumference cone-shaped surface 11. Exhaust may leave the separator by primary exhaust return 14 or secondary exhaust return 15. Before being re-circulated to inlet 10 the water stream is filtered by a particle filter 25 to recover a particulate containing fraction from the water stream. The particle filter may be removed and the recovered particles may be analyzed for the presence of taggant atoms.

Figure 5:
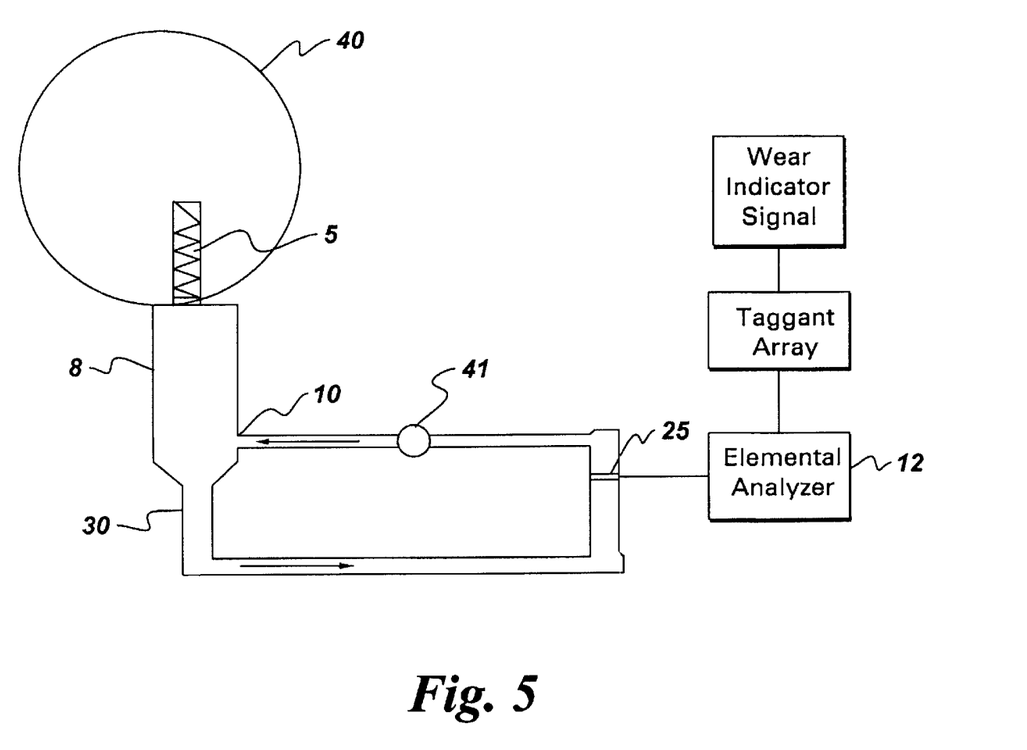
FIG. 5 Schematically depicts a block diagram for collecting and detecting taggants according to one embodiment of the invention.

The instant system for inspection and sampling is also depicted by block diagram in FIG. 5 wherein tubes 5 face directly into an exhaust gas stream of turbine 40. The tubes 5 are in fluid communication with separator 8. Rinse water containing exhaust particles leaves the separator 8 at outlet 30 and proceeds to particle filter 25. Pump 41 continually forces rinse water back to separator inlet 10. The filter may be removed and the filtered particles may be subjected to elemental analysis by analyzer 12 to assay for taggant particles. The presence of taggant particles generates a wear indicator signal.

Figure 6:
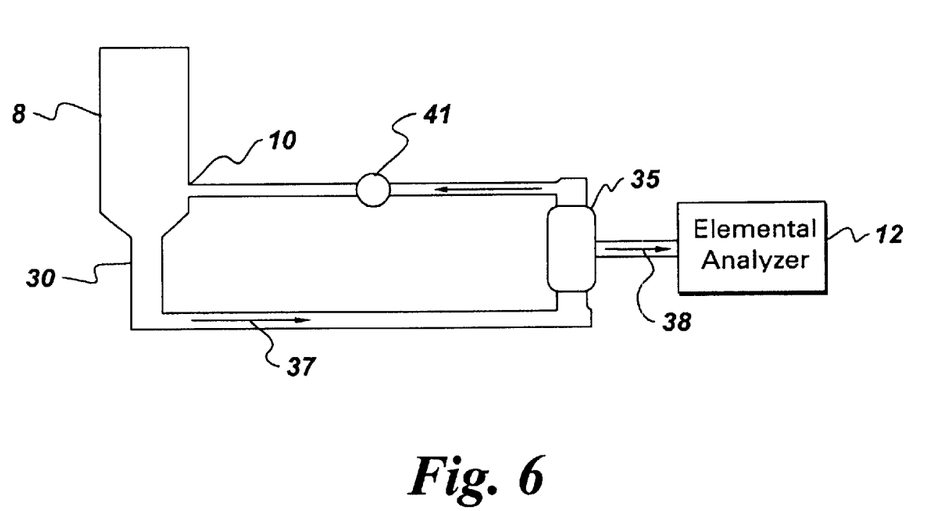
FIG. 6 Schematically depicts a block diagram for collecting and detecting taggants according to an alternate embodiment of the invention.

Alternatively, particles may be delivered directly to an elemental analyzer. With reference to block diagram in FIG. 6, rinse water 37 from outlet 30 of separator 8 is continuously forced by pump 41 to centrifuge 35 to the separate rinse water into a small particle-containing fraction 38 and a major fraction 39 which is recirculated to separator inlet 10. The particulate-containing fraction is delivered into analyzer 12, for example, an inductively coupled plasma flame spectrometer or mass spectrometer, which can assay the particulate containing fraction for presence of taggant.

Figure 3:
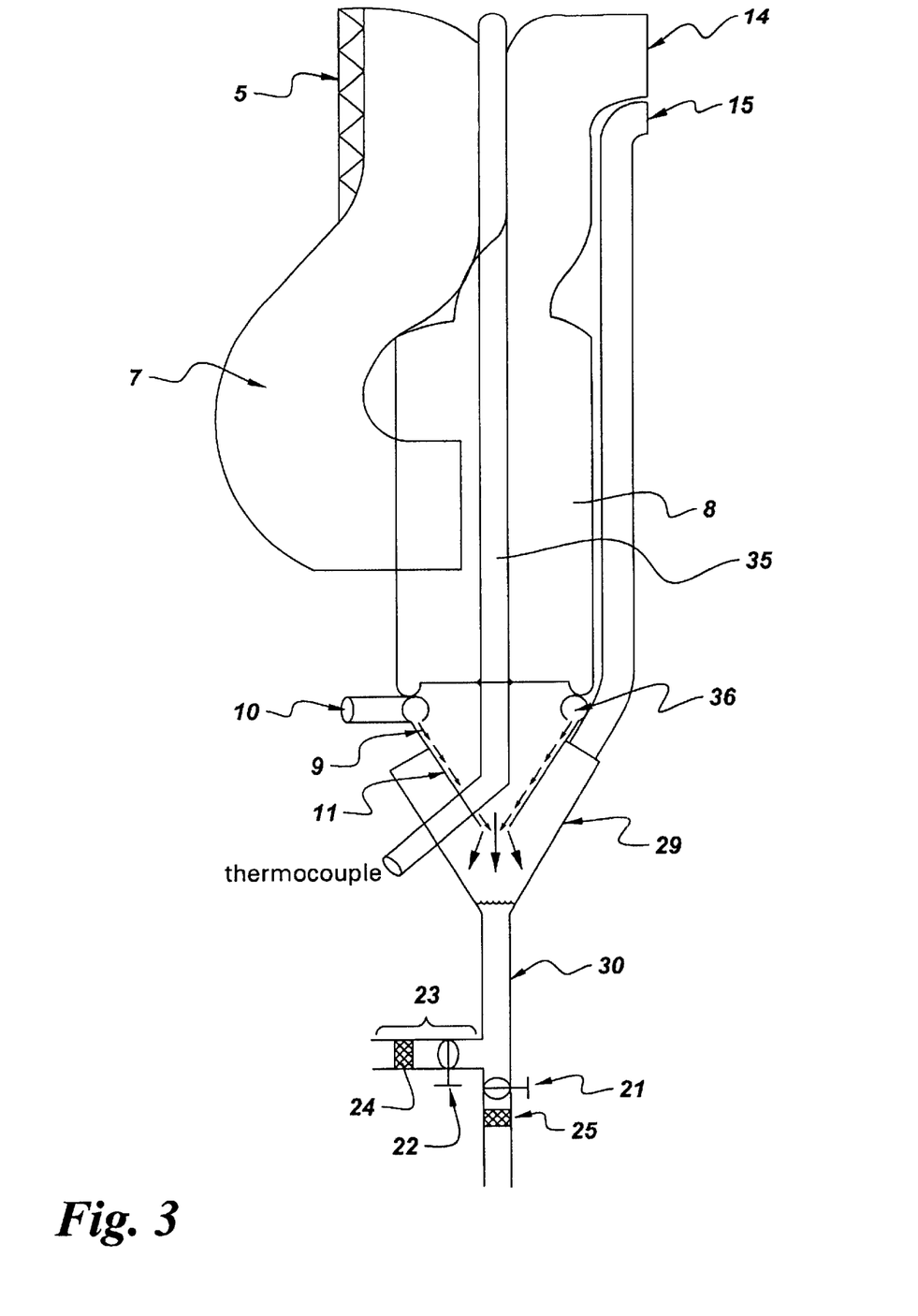
FIG. 3 Depicts a cross-sectional view of an embodiment of the invention for collecting particles from an exhaust stream.

With reference to FIG. 3, particles separated from the exhaust stream by the cyclone separator are carried by exhaust gas to a compartment 23 which is lined with a fine particle filter 24 and is connected to the separator for periodic retrieval and analysis, for example, by closing valve 21 and opening valve 22 such that particles will then be deposited in compartment 23 by way of deposition on compartment filter 24. An auxiliary pump may be used so that water stream at the output of the separator 8 is pressurized and forced through the particulate filters 25 or 24.

Similarly, if the particles are being carried by exhaust gas, this gas stream may be pressurized and forced through filter 24. This would be appropriate if the filter had very fine pores for trapping very small particles. The high gas temperatures associated with gas turbine operation may require that the filter material be fabricated from ceramic fibers.

Figure 4:
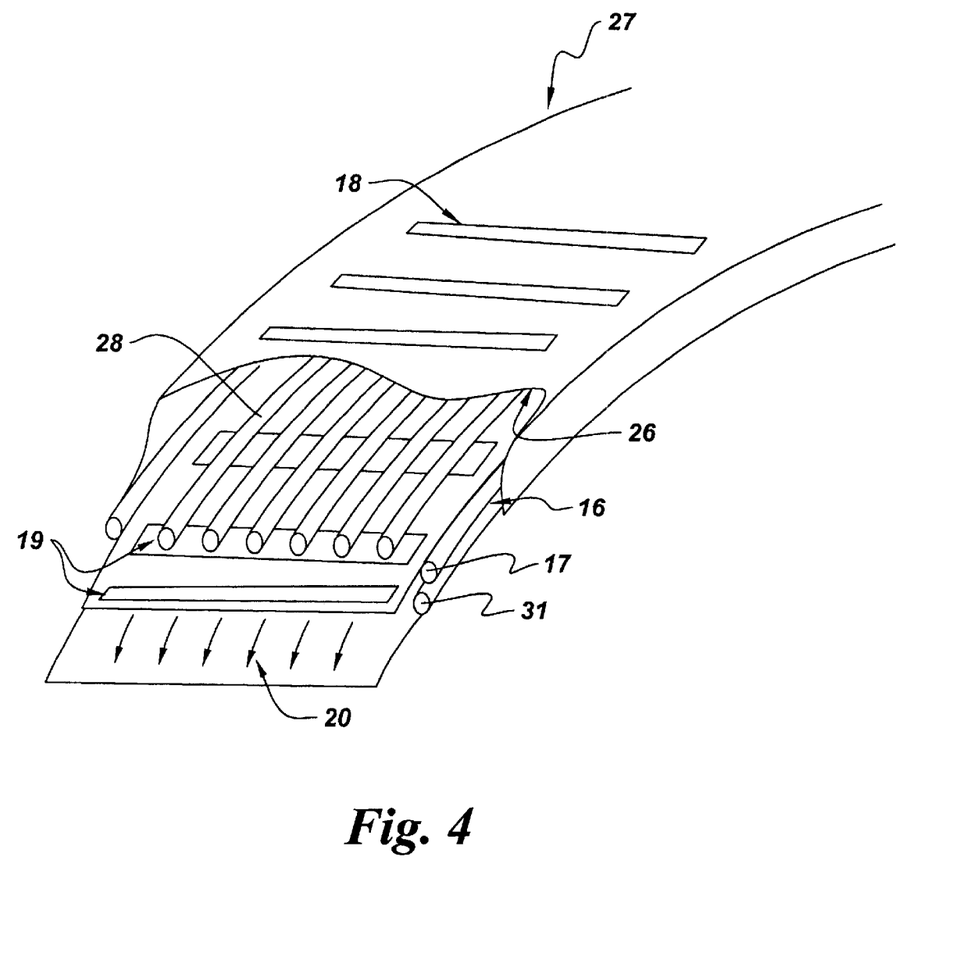
FIG. 4 Depicts another embodiment for collecting particles from an exhaust stream.

FIG. 4 schematically depicts another possible method for collecting particles from the exhaust stream. Here, an electrostatic precipitator in the form of an annular ring 27 with particle inlet slots 18 is placed downstream from the turbine at a radius approximately corresponding to the center of the airfoils in the last stage of the turbine. The outer surface 26 and/or the inner surface 16 of this device is comprised of two metallic sheets with many narrow corresponding slots 19 in them. These two sheets comprise a fixed sheet 17 and a moveable sheet 31 respectively. When the slots 19 in the two sheets 17 and 31 line up, the precipitator is "open" and is capable of collecting particles, and when one sheet is slightly rotated with respect to the other sheet, so the slots no longer line up, and the precipitator is "closed". Application of an electric field within the device provides for the collection of a particle containing fraction via high voltage wires 28. When the precipitator is closed, it can be purged of its load of particles by a purging gas 20, which can deliver the particle containing fraction to a filter for concentration, or optionally, can deliver the particle containing fraction to an analyzer, for detection of the taggant. Preferably, this purging operation takes place through an aperture that rotates around the device so that the particles coming from a specific angular location can be delivered at a predetermined time and be kept separate from particles that were collected at different locations. This rotating aperture can be implemented, for example, by providing cylindrical sheets 17 and 31 with slots in them. The rotating aperture is implemented by sliding one of these sheets 17, for example, with respect to a fixed sheet 31. As sheet 17 slides circumferentially, a portion of the slots 19 in sheets 17 and 31 align with each other, and the location of this aligned region rotates around when the moveable belt slides. For example, if the two sheets 17 and 31 are provided having slots 19 spaced at slightly different pitch, the region where the slots line up can be made to rotate around the cylinder as a result of a relatively small relative motion of the sheets. It may be possible to use the exhaust gas itself as the purge gas, or it may be preferable to provide a separate gas source for this purpose.

Analysis of the particulate containing fraction may be accomplished by a number of well-known methods including well-known devices such as plasma flame spectrometry and mass spectrometry. The preferred embodiment also includes exhaust sampling at different regions of the exhaust annulus, in order to sample particular parts of the turbine. In this regard, taggants from rotating airfoils will probably be somewhat distributed and diluted throughout the exhaust stream. However, taggant particles from stationary parts, such as the combustors, will continue along an exhaust gas "stream line" into the exhaust annulus. The instant invention therefore includes particle collection at these locations in the exhaust stream for more effective sampling of particular parts. For example, with reference to FIG. 5, tube 5 may be located directly downstream from a particular combustor. In this manner, one collector may selectively sample one combustor located at the same angular position as the combustor. The instant methods and turbine may be used for energy generation, jet engines for aircraft, diesel engines for transportation, steam turbines for energy generation, and other machines that have coatings. Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description. The invention, thus generally described, will be understood more readily by reference to the following examples, which are provided by way of illustration and are not intended to be limiting of the present invention.

EXAMPLE

Figure 7:
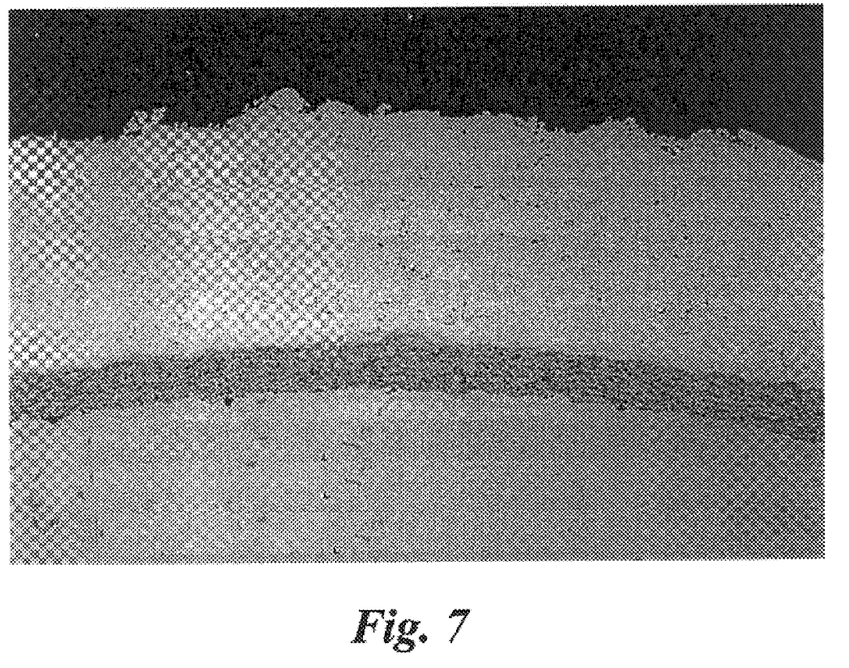
FIG. 7 Depicts a cross-sectional view of the as-deposited test sample with a Ru-containing taggant layer.

FIG. 7 is a cross sectional view of a sample component substrate with an environmentally resistant coating comprising an Ru taggant. The coating composition is: 35.7% Co, 32% Ni, 22% Cr, 10% Al, and 0.3% Y in weight percent. The layer comprising Ru taggant has a composition of 26.8% Ni, 46.4% Ru, 4.7% Cr, and 22.1% Al in weight percent. The substrate is a superalloy has a composition of: 60.39% Ni, 9.5% Co, 14.0% Cr, 3.0% Al, 4.9% Ti, 2.8% Ta, 3.8% W, 1.5% Mo, 0.1% C, and 0.01% B in weight percent. The coating layers were deposited using the HVOF method well known in the art. FIG. 7 depicts the as-deposited condition.

Figure 8:
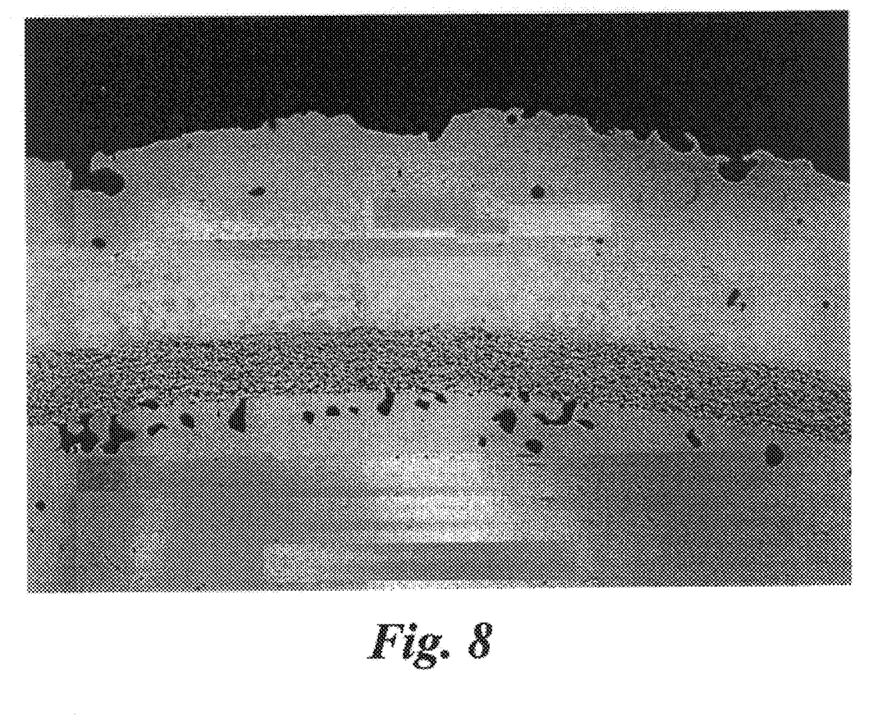
FIG. 8 Depicts a cross-sectional view of the coating after a high temperature exposure at 1150° C. for 450 hours.

After the sample was exposed at 1150° C. for 450 hours, the coating microstructure is shown in FIG. 8. It can be seen that there was very little growth of the Ru-containing layer, demonstrating stability of the taggant layer with respect to high temperature exposure. When the coating deteriorates by oxidation and wear, and deterioration reaches location A, then the coating will start to release the Ru taggant into the exhaust stream. The presence of Ru in the exhaust would indicate that most of the coating has been consumed and signals an endpoint of coating life.

What is claimed is:

1. An on-line method of assessing wear and/or damage to gas turbine parts, comprising the steps of:
   (a) providing one or more gas turbine parts with a coating comprising a taggant, said coating comprising at least one of an environmental coating, a thermal barrier coating, and a bond coat;
   (b) collecting particles of an exhaust gas stream which passed over a part provided in step (a) to provide a particulate containing fraction; and
   (c) analyzing the particulate containing fraction for the taggant, whereby the presence of which indicates at least one of wear or damage to the gas turbine part.

2. A method according to claim 1, wherein the gas turbine part is selected from the group consisting of combustors, transition pieces, and airfoils.

3. A method according to claim 1, wherein the taggant is selected from the group consisting of Sr, La, Ce, Pr, Nd, Sm, Eu, Gd, Tb, Dy, Ho, Er, Tm, Yb, Lu, Re, Ru, Pd, Pt, and Au.

4. A method according to claim 1, wherein the coating comprises multiple layers.

5. A method according to claim 4, wherein the taggant is incorporated in one or more layer interfaces of the coating.

6. A method according to claim 5, wherein each interface contains a different taggant.

7. A method according to claim 4, wherein the taggant is incorporated in one or more layers of the coating.

8. A method according to claim 7, wherein each of the layers independently comprises a different taggant.

9. A method according to claim 4, wherein the layers comprise a thermal barrier coat (TBC) and a bond coat.

10. A method according to claim 9, wherein the TBC or a TBC interface comprises a taggant selected from the group consisting of Sr, La, Ce, Pr, Nd, Sm, Eu, Gd, Tb, Dy, Ho, Er, Tm, Yb, and Lu, and the bond coat or a bond coat interface comprises a taggant selected from the group consisting of La, Ce, Pr, Nd, Sm, Eu, Gd, Tb, Dy, Ho, Er, Tm, Yb, Lu, Re, Ru, Pd, Pt, and Au, and wherein the TBC or TBC interface taggant is different from the bond coat or bond coat interface taggant.

11. A method according to claim 1, further comprising concentrating particles in the particulate containing fraction before analyzing the particles for the taggant.

12. A gas turbine, comprising:
    (a) one or more gas turbine parts provided with a coating comprising a taggant, said coating comprising at least one of an environmental coating, a thermal barrier coating, and a bond coat;
    (b) a exhaust gas collector in fluid communication with the gas turbine parts, whereby the collector samples a portion of an exhaust gas which passed over the coated gas turbine parts; and
    (c) an exhaust particle separator connected to gas exhaust collector, whereby the separator separates particles from the exhaust gas.

13. A gas turbine according to claim 12, further comprising a storage compartment connected to the separator, whereby particles separated by the separator are stored.

14. A gas turbine according to claim 12, wherein the gas turbine part is selected from the group consisting of combustors, transition pieces, and airfoils.

15. A gas turbine according to claim 12, wherein the taggant is selected from the group consisting of, Sr, La, Ce, Pr, Nd, Sm, Eu, Gd, Tb, Dy,Ho, Er, Tm, Yb, Lu, Re, Ru, Pd, Pt, and Au.

16. A gas turbine according to claim 12, wherein the coating comprises multiple layers.

17. A gas turbine according to claim 16, wherein the taggant is incorporated at one or more layer interfaces of the coating.

18. A gas turbine according to claim 16, wherein the taggant is incorporated in one or more layers of the coating.

19. A gas turbine according to claim 18, wherein each of the layers independently comprises a different taggant.

20. A gas turbine according to claim 16, wherein the layers comprise a thermal barrier coat (TBC) and a bond coat.

21. A gas turbine according to claim 20, wherein the TBC or a TBC interface comprises a taggant selected from the group consisting of Sr, La, Ce, Pr, Nd, Sm, Eu, Gd, Tb, Dy, Ho, Er, Tm, Yb, and Lu, and the bond coat or a bond coat interface comprises a taggant selected from the group consisting of La, Ce, Pr, Nd, Sm, Eu, Gd, Tb, Dy, Ho, Er, Tm, Yb, Lu, Re, Ru, Pd, Pt, and Au, and wherein the TBC or TBC interface taggant is different from the bond coat or bond coat interface taggant.

22. A gas turbine according to claim 12, wherein the separator is a cyclone separator.

23. A gas turbine according to claim 12, wherein the separator is an electrostatic precipitator.

24. A gas turbine according to claim 12, further comprising an analyzer connected to the separator, wherein the analyzer is capable of detecting the taggant.

25. A gas turbine according to claim 24, wherein the analyzer is an inductively coupled plasma flame spectrometer or a mass spectrometer.

26. A gas turbine according to claim 12, further comprising a particle concentrator connected to the separator.

27. A gas turbine according to claim 12, wherein said exhaust gas collector comprises tubes, and wherein the separator is a cyclone separator, and further comprising a particle concentrator comprising a particle filter in fluid connection with the separator.

28. A gas turbine according to claim 12, wherein said exhaust gas collector is an annular ring comprising one or more slots, and wherein the separator is an electrostatic precipitator comprising a high voltage wire.

29. A part for a gas turbine comprising:
    a) a turbine component substrate; and
    b) an environmental resistant coating applied on the turbine component substrate; and
       wherein the environmental coating or a coating/substrate interface comprises a taggant selected from the group consisting of La, Ce, Pr, Nd, Sm, Eu, Gd, Tb, Dy, Ho, Er, Tm, Yb, Lu, Re, Ru, Pd, Pt, and Au.

30. A part for a gas turbine comprising:
    a) a turbine component substrate;
    b) a bond coat provided on the turbine component substrate; and
    c) a thermal barrier coat (TBC) applied over the bond coat,
       wherein the TBC or a TBC interface comprises a taggant selected from the group consisting of Sr, La, Ce, Pr, Nd, Sm, Eu, Gd, Tb, Dy, Ho, Er, Tm, Yb, and Lu, and the bond coat or a bond coat interface comprises a taggant selected from the group consisting of La, Ce, Pr, Nd, Sm, Eu, Gd, Tb, Dy, Ho, Er, Tm, Yb, Lu, Re, Ru, Pd, Pt, and Au, and wherein the TBC or TBC interface taggant is different from the bond coat or bond coat interface taggant.

31. A gas turbine, comprising:

(a) one or more gas turbine parts provided with a coating comprising a taggant, said coating comprising at least one of an environmental coating, a thermal barrier coating, and a bond coat;

(b) a collector means for sampling a portion of an exhaust gas which passed over the coated gas turbine parts, said collector means in fluid communication with said turbine parts; and (c) a separator means for separating particles from the exhaust gas, said separator means connected to said collector means.

32. A gas turbine according to claim 31, further comprising an analyzer means for detecting the presence of the taggant in the particles and a concentrator means for concentrating the particles.

33. A part for a gas turbine according to claim 29, wherein the elements selected from the group consisting of La, Ce, Pr, Nd, Sm, Eu, Gd, Tb, Dy, Ho, Er, Tm, Yb, Lu, Re, Ru, Pd, Pt, and Au are present exclusively as taggants so that their collection pinpoints where damage has occurred.

* * * * *